UNITED STATES PATENT OFFICE.

JOHN L. KELLOGG, OF BATTLE CREEK, MICHIGAN, ASSIGNOR TO KELLOGG TOASTED CORN FLAKE CO., OF BATTLE CREEK, MICHIGAN.

PROCESS OF PREPARING SHREDDED CEREAL PRODUCTS.

1,159,045.  Specification of Letters Patent.  Patented Nov. 2, 1915.

No Drawing.   Application filed September 16, 1912.   Serial No. 720,471.

*To all whom it may concern:*

Be it known that I, JOHN L. KELLOGG, a citizen of the United States, residing at Battle Creek, Michigan, have invented certain new and useful Improvements in Process of Preparing Shredded Cereal Products, of which the following is a specification.

This invention relates to improvements in shredded cereal-products and the process of preparing same.

The objects of this invention are: First, to provide a superior shredded wheat or cereal food product in which the product has been thoroughly and completely cooked and aerated. Second, to provide an improved process of thus treating wheat or similar cereal.

My invention relates to and is particularly adapted for the treatment of whole wheat, but other grains may be similarly treated.

In the preferred method and process I take whole wheat and grind the same on a French bur stone to crush and not cut and destroy the texture. To a six hundred pound batch of such whole wheat unbolted flour, I add two hundred and fifty pounds of water in which I have previously thoroughly dissolved six per cent. of sugar and two per cent. of salt. I then mix the flour in this water with a rotary mixer very thoroughly for a period of ten minutes, or thereabout, until the mass is a very thick, heavy dough. This dough is delivered from the mixer and rolled out into a thick slab about two inches thick, and preferably into a layer about twenty-four inches wide and twelve inches long, the material, passing under a suitable roller for the purpose. This heavy dough is then placed in covered pans and put in a steam retort, where it is subjected to steam heat for a period of about one and one half hours at fifteen pounds' pressure, which gives a temperature of about 250 degrees Fahr. The material thus cooked is taken from the pans and placed in wire racks where it is dried for a period of twenty-four hours in the open air. This dried and cooked dough is then passed through a rotary swing hammer breaker, which breaks the material up into cubes about one inch square. These lumps are then passed through a breaker or grinder which reduces to dimensions of about the size of a split pea.

The material thus reduced to the size of a pea is passed through a Hess drier, or similar drier, and a current of dry air is delivered through the same until the material is thoroughly air dried. The material in the air dried condition is then passed through shredding rollers and delivered in layers to suitable bake pans and is cut up into suitable biscuits, or any form that may be desired and suitably compressed and passed in the baking pans, suitably covered, to a suitable oven where the same is baked for thirty minutes at a temperature of from 450° to 500° Fahr. This thoroughly bakes the material, and it is then passed from the baking oven, removed from the bake pans and passed through a drying oven, where, for a period of one hour, a current of air at a temperature of from 250° to 300° Fahr. is caused to circulate over and through the biscuits or shredded material thus formed. The biscuit, when thus thoroughly cooked and dried, has much the appearance of the ordinary shredded wheat biscuit, the difference being that the material is thoroughly cooked and converted to dextrin, making a very digestible aerated bread or food, the other constituents not being destroyed but thoroughly cooked.

I desire to state that this process can be considerably varied. It is a requirement that the flour be whole wheat or whole grain flour, and that the same be ground by crushing, as distinguished from a cutting of the texture of the grain. The grain should be thoroughly treated and mixed and steamed, and thereafter reduced to granules, shredded, baked and dried in order to secure the best results. A fairly complete conversion of the starchy material to dextrin is accomplished without injury to the food values of the other constituents of the grain, and the whole is aerated and light and palatable.

Having thus described my invention, what I claim as new and desire to secure by Letters Patent is:

1. The process of preparing a shredded biscuit consisting in first grinding the grain by a crushing action, second, cooking the same in a suitable steam retort at about fifteen pounds' pressure, air drying the steamed mass for substantially twenty-four hours, reducing the dried mass to granules, air drying the granules in a current of air, subjecting the granules to the action of shredding rollers, baking the material in covered pans in an oven at a temperature of from 400° to 500° Fahr., and removing from the pans and drying the same in an air current at a temperature of 250° to 300° Fahr.

2. The process of preparing a shredded biscuit consisting in first grinding the grain by a crushing action, second, cooking the same in a suitable steam retort at about fifteen pounds' pressure, air drying the steamed mass, reducing the dried mass to granules, air drying the granules, subjecting the granules to the action of shredding rollers, baking the material in covered pans in an oven at a temperature of from 400° to 500° Fahr., and removing from the pans and drying the same at a temperature of 250° to 300° Fahr.

In witness whereof, I have hereunto set my hand and seal in the presence of two witnesses.

JOHN L. KELLOGG. [L. S.]

Witnesses:
    CHAS. M. MARBLE,
    H. E. RALPH.